(12) United States Patent
Liu

(10) Patent No.: US 10,083,135 B2
(45) Date of Patent: Sep. 25, 2018

(54) COOPERATIVE OVERLAY

(71) Applicant: Macronix International Co., Ltd., Hsinchu (TW)

(72) Inventor: Yi Chun Liu, Zhubei (TW)

(73) Assignee: Macronix International Co., Ltd., Hsinchu (TW)

( * ) Notice: Subject to any disclaimer, the term of this patent is extended or adjusted under 35 U.S.C. 154(b) by 509 days.

(21) Appl. No.: 14/838,949

(22) Filed: Aug. 28, 2015

(65) Prior Publication Data
US 2017/0060793 A1    Mar. 2, 2017

(51) Int. Cl.
| G06F 12/00 | (2006.01) |
| G06F 13/28 | (2006.01) |
| G06F 12/1081 | (2016.01) |
| G06F 13/00 | (2006.01) |

(52) U.S. Cl.
CPC .......... *G06F 13/28* (2013.01); *G06F 12/1081* (2013.01); *G06F 2212/1021* (2013.01)

(58) Field of Classification Search
CPC ................. G06F 13/28; G06F 12/1081; G06F 2212/1021
See application file for complete search history.

(56) References Cited

U.S. PATENT DOCUMENTS

| 5,624,316 | A | * | 4/1997 | Roskowski | ............. A63F 13/02 463/41 |
| 7,886,198 | B2 | * | 2/2011 | Swoboda | ............ G06F 11/3636 714/45 |
| 7,962,684 | B2 | * | 6/2011 | Struk | ..................... G06F 12/123 711/103 |
| 2009/0210615 | A1 | | 8/2009 | Struk et al. | |
| 2010/0023673 | A1 | * | 1/2010 | Struk | ....................... G06F 12/08 711/103 |

FOREIGN PATENT DOCUMENTS

TW            200622604 A      7/2006

\* cited by examiner

*Primary Examiner* — Mark A Giardino, Jr.
(74) *Attorney, Agent, or Firm* — Finnegan, Henderson, Farabow, Garrett & Dunner, LLP

(57) ABSTRACT

An embedded system includes a program to be executed. The program is divided into overlays. The embedded system includes a processor configured to request one of the overlays. The requested overlay includes a segment of the program to be executed by the processor. The embedded system also includes a first level memory device coupled to the processor. The first level memory device stores less than all of the overlays of the program. The embedded system further includes a memory management unit coupled to the processor and the first level memory device. The memory management unit is configured to determine, based on a logical address provided by the processor, whether the requested overlay is stored in the first level memory device. The memory management unit is additionally configured to convert the logical address to a physical address when the requested overlay is stored in the first level memory device. The physical address points to the requested overlay.

19 Claims, 5 Drawing Sheets

COOPERATIVE OVERLAY

TECHNOLOGY FIELD

The present disclosure generally relates to methods and devices for managing memory resources.

BACKGROUND

In a computer system, memory storage accessible to a processor may be implemented as a memory hierarchy, which includes multiple levels of memory devices having different storage sizes and access speeds. To reduce processing time, a faster memory device is placed at a higher level of memory hierarchy than a slower memory device. A memory device having a faster access speed tends to be more expensive per bit than a memory device having a slower access speed. Thus, the storage size of the faster memory device, which is placed at a higher level of memory hierarchy, may be smaller than the storage size of the slower memory device, which is placed at a lower level of memory hierarchy.

For example, in a computer system, a top or a first level of the memory hierarchy may include Static Random Access Memory (SRAM). This level of memory is typically referred to as a cache. A second level of the memory hierarchy includes a memory device that is slower but larger in storage size than SRAM, such as a Dynamic Random Access Memory (DRAM). This level of memory is typically referred to as a main memory. Additionally, a third level of the memory hierarchy includes an even slower memory device, such as a magnetic disc drive or a solid-state drive, having the largest storage size in the computer system. This level of memory hierarchy is typically referred to as a secondary storage.

To take advantage of the speeds and storage sizes in different levels of the memory hierarchy, information (such as data or programs) is divided into many segments and also stored in a hierarchical structure. For example, an entire executable program is stored at a lower level of the memory hierarchy. However, in general, some segments of the executable program are also stored at a higher level of the memory hierarchy. For example, those segments that are recently or frequently accessed are stored at a higher level of the memory hierarchy, which has higher access speed, to reduce access time.

To execute a certain function of a program, for example, a processor first requests from a first (or highest) level of the memory hierarchy a segment of the program that includes the function to be executed. If the requested segment exists at the first level, the processor executes the function included in the requested segment. This situation is called a "hit." If the requested segment does not exist at the first level, the requested segment is copied from a lowerlevel of memory hierarchy to the first level to be executed by the processor. This situation is called a "miss."

Similarly, to access certain data, for example, a processor first requests from a first (or highest) level of the memory hierarchy a segment of the data to be accessed. If the requested segment exists at the first level, the processor accesses the requested segment. This situation is called a "hit." If the requested segment does not exist at the first level, the requested segment is copied from a lower level of memory hierarchy to the first level to be accessed by the processor. This situation is called a "miss"

The above described memory management scheme can be implemented between a cache memory and a main memory, and the scheme is known as cache. A similar scheme, known as virtual memory, can be implemented to manage memory resources between a main memory and a secondary storage.

SUMMARY

According to an embodiment of the disclosure, an embedded system includes a program o be executed. The program is divided into overlays. The embedded system includes a processor configured to request one of the overlays. The requested overlay includes a segment of the program to be executed by the processor. The embedded system also includes a first level memory device coupled to the processor. The first level memory device stores less than all of the overlays of the program. The embedded system further includes a memory management unit coupled to the processor and the first level memory device. The memory management unit is configured to determine, based on a logical address provided by the processor, whether the requested overlay is stored in the first level memory device. The memory management unit is additionally configured to convert the logical address to a physical address when the requested overlay is stored in the first level memory device. The physical address points to the requested overlay.

According to another embodiment of the disclosure, an embedded system includes a program to be executed. The program is divided into overlays. The embedded system includes a processor configured to request one of the overlays based on a logical address of the requested overlay. The requested overlay includes a segment of the program to be executed by the processor. The logical address includes logical area bits, logical segment bits, and logical offset bits. The embedded system also includes a first level memory device coupled to the processor. The first level memory device stores less than all of the overlays of the program. The embedded system additionally includes a translator coupled to the processor. The translator is configured to receive the logical segment bits from the processor, and convert, when the requested overlay is stored in the first level memory device, the logical segment bits into physical segment bits of a physical address, The physical address points to the requested overlay stored in the first level memory device. The embedded system further includes a comparator, coupled to the processor, to receive the logical area bits of the logical address. The comparator is configured to provide a selection signal based on the logical area bits. The embedded system additionally includes a multiplexer to receive the logical address, the physical address, and the selection signal. The multiplexer is configured to output one of the logical address and the physical address based on the selection signal.

According to another embodiment of the disclosure, an embedded system includes data to be accessed. The data are divided into overlays. The embedded system includes a processor configured to request one of the overlays. The requested overlay includes a segment of the data to be accessed by the processor. The embedded system further includes a first level memory device coupled to the processor. The first level memory device stores less than all of the overlays of the data. The embedded system further includes a memory management unit coupled to the processor and the first level memory device. The memory management unit is configured to determine, based on a logical address provided by the processor, whether the requested overlay is stored in the first level memory device, and convert the logical address to a physical address when the requested overlay is stored in the first level memory device. The physical address points to the requested overlay.

According to another embodiment of the disclosure, an embedded system includes data to be accessed. The data are divided into overlays. The embedded system includes a processor configured to request one of the overlays based on a logical address of the requested overlay. The requested overlay includes a segment of the data to be accessed by the processor. The logical address includes logical area bits, logical segment bits, and logical offset bits. The embedded system also includes a first level memory device coupled to the processor. The first level memory device stores less than all of the overlays of the data. The embedded system further includes a second level memory device coupled to the processor and the first level memory device. The second level memory device stores all of the overlays of the data. The embedded system additionally includes a translator coupled to the processor. The translator is configured to receive the logical segment bits from the processor, and convert, when the requested overlay is stored in the first level memory device, the logical segment bits into physical segment bits of a physical address. The physical address points to the requested overlay stored in the first level memory device. The embedded system further includes a comparator, coupled to the processor, to receive the logical area bits of the logical address. The comparator is configured to provide a selection signal based on the logical area bits. The embedded system additionally includes a multiplexer to receive the logical address, the physical address, and the selection signal. The multiplexer is configured to output one of the logical address and the physical address based on the selection signal.

BRIEF DESCRIPTION OF THE DRAWINGS

The accompanying drawings, which are incorporated in and constitute a part of this specification, illustrate several embodiments.

DESCRIPTION OF EXAMPLE EMBODIMENTS

Figure 1:
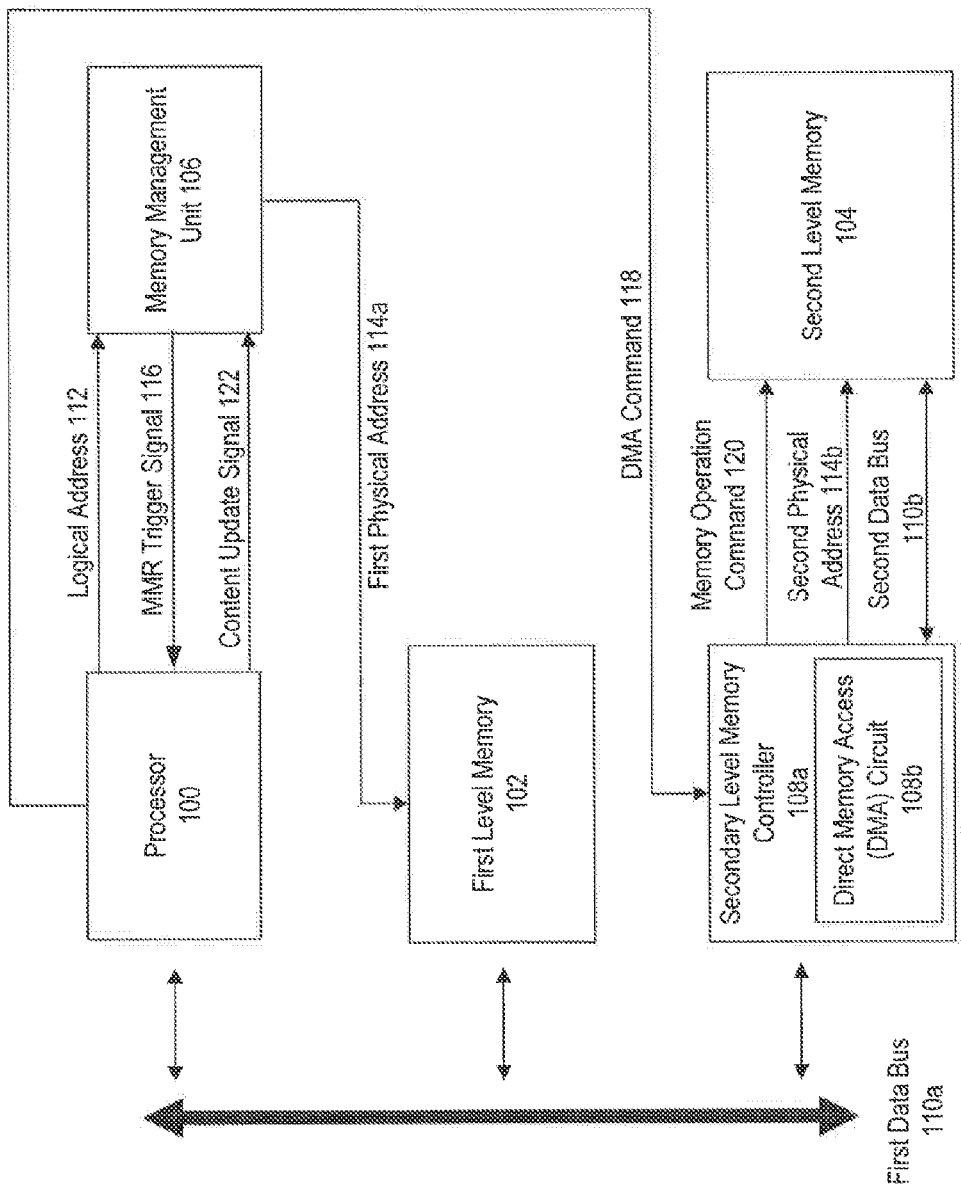
FIG. 1 is a diagram illustrating an embedded system including a memory hierarchy.

Reference will now be made in detail to the example embodiments, which are illustrated in the accompanying drawings.

An alternative memory management scheme to cache and virtual memory is known as overlay. Overlays are segments of a program or data. Programmers divide a program or data into overlays (segments) when a size of the entire program or data is larger than a first level of a memory hierarchy. Sizes of the overlays may be the same or different for the program or data. An overlay scheme may be used when virtual memory is not a practical solution, such as when system resources are limited (e.g., limited storage sizes of memory devices, limited functions of an operating system, limited functions of a compiler, or limited speed of a processor) in a computer system. One example of a computer system having limited resources is an embedded system.

An embedded system, unlike a general-purpose computer, is generally designed for certain applications, such as controlling traffic lights or an MP3 player. The embedded system may contain limited resources to support the particular application. For that reason, an embedded system may utilize a relatively slower processor and may only include two levels of memory hierarchy, which may have less storage available than those on general-purpose computers. In the embedded system, a first level of the memory hierarchy may be a volatile memory (e.g., RAM), and a second level may be a non-volatile memory (e.g., flash memory).

The embedded system may benefit from the two-level memory hierarchy by storing recently or frequently accessed overlays at the first level of the memory hierarchy. Accordingly, the overlays can be accessed at a faster speed from the first level of the memory hierarchy.

To execute a certain function of a program, for example, a processor in the embedded system requests from the RAM an overlay that includes the function to be executed. If the requested overlay exists in the RAM (a "hit"), the processor executes the function included in the overlay. If the requested overlay does not exist in the RAM (a "miss"), then the processor copies the requested overlay from the flash memory to the RAM, and then execute the function included in the overlay. Similarly, to access a segment of data, for example, a processor in the embedded system requests from the RAM an overlay that includes the segment of data to be accessed. If the requested overlay exists in the RAM (a "hit"), the processor accesses the segment of data included in the overlay. If the requested overlay does not exist in the RAM (a "miss"), then the processor copies the requested overlay from the flash memory to the RAM, and then accesses the segment of data included in the overlay.

Conventionally, a memory management routine (MMR) determines "hit" or "miss," and subsequent steps following the "miss" situation. However, MMR is software-based and, thus, operations of MMR strain the already-limited system resources in the embedded system. An alternative method and device for managing memory that reduce usage of MMR are presented.

Referring to FIG. 1, an embedded system 10 includes a processor 100, a first level memory 102, a second level memory 104, a memory management unit 106, a secondary level memory controller 108a, a first data bus 110a, and a second data bus 110b. Secondary level memory controller 108a includes a direct memory access (DMA) circuit 108b to move an overlay, which includes multiple words, in its entirety as opposed to moving an overlay word by word, between first level memory 102 and second level memory 104. "Word" as used herein refers to a unit of memory which includes a certain number of bits. Processor 100 may be a general-purpose processor or an application-specific microcontroller. First level memory 102 may be a volatile memory, such as a RAM, and second level memory 104 may be a non-volatile memory, such as a flash memory.

Several executable programs can be stored in second level memory 104. One of the executable programs is divided into overlays. All overlays for the divided executable program are stored in second level memory 104. Some of the overlays, which are recently or frequently accessed by the processor, are stored in first level memory 102. While embedded system 10 is described as having one divided executable program stored in second level memory 104, it is not so limited and can include a plurality of divided executable programs stored in second level memory 104.

Similarly, data can also be stored in second level memory 104, and are divided into overlays, which are stored in a similar manner to the overlays of an executable program. All overlays for the divided data are stored in second level memory 104. Some overlays of the data, which are recently or frequently accessed by the processor, are also stored in first level memory 102. Further, overlays of data may be accessed to be written with new information. When an overlay of the data is accessed to be written with new information, programmers may utilize a synchronization protocol, such as a "write-through" protocol or a "write-back" protocol, to maintain consistency of overlays stored in first level memory 102 and second level memory 104. The "write-through" protocol and the "write-back" protocol are executed by processor 100.

Regarding the "write-through" protocol, when an overlay stored in first level memory 102 is accessed to be written with new information, the new information is written to both the overlay stored in first level memory 102 and a corresponding overlay stored in second level memory 104. Thus, in the "write-through" protocol, the overlay stored in first level memory 102 and the corresponding overlay stored in second level memory 104 remain consistent after each write. When the overlay stored in first level memory 102 is consistent with the overlay stored in second level memory 104, the overlay stored in first level memory 102 is "clean." Thus, for the "write-through" protocol, the overlay stored in first level memory 102 remains "clean" after each write.

On the other hand, for the "write-back" protocol, when an overlay stored in first level memory 102 is accessed to be written with new information, the new information is written to the overlay stored in first level memory 102, but the new information is not immediately written to the corresponding overlay stored in second level memory 104. The corresponding overlay stored in second level memory 104 is written with the new information when the overlay stored in first level memory 102 is replaced. The overlay stored in first level memory 102 is replaced, for example, in a "miss" situation, as discussed further below. Thus, in the "write-back" protocol, the overlay stored in first level memory 102 and the corresponding overlay stored in second level memory 104 may be inconsistent until the overlay stored in first level memory 102 is replaced and the corresponding overlay stored in second level memory 104 is written with the same new information that is written to the overlay stored in first level memory 102. When the overlay stored in first level memory 102 is inconsistent with the overlay stored in second level memory 104, the overlay stored in first level memory 102 is "dirty." Thus, for the "write-back" protocol, the overlay stored in first level memory 102 may become "dirty" after each write. A flag can be used to indicate whether the overlay stored in first level memory 102 is "clean" or "dirty."

Each overlay may include a function to be executed by processor 100. To execute the function, processor 100 requests the overlay including the function. Each overlay may additionally or alternatively include a segment of data to be accessed by processor 100. To access the segment of data, processor 100 requests the overlay including the segment of data. Processor 100 requests the overlay by first providing a logical address 112 of the overlay to memory management unit 106. Then, memory management unit 106 determines, based on logical address 112, whether the requested overlay exists in first level memory 102. If the requested overlay exists in first level memory 102 (a "hit"), then memory management unit 106 outputs a first physical address 114a of the overlay. First physical address 114a points to the requested overlay in first level memory 102. Processor 100 then accesses the overlay, based on first physical address 114a, and executes the function or accesses the segment of data included in the overlay. In this example, a memory management routine (MMR) is not required in the "hit" situation to convert logical address 112 to first physical address 114a based on the overlay request of processor 100. Therefore, usage of MMR can be reduced.

If the requested overlay does not exist in first level memory 102 (a "miss"), then memory management unit 106 provides an MMR trigger signal 116 to processor 100 to trigger the MMR, which is executed by processor 100. After the MMR is triggered, processor 100 issues a DMA command 118 to DMA circuit 108b of second level memory controller 108a. In response, DMA circuit 108b issues a memory operation command 120 (e.g., a read command) and a second physical address 114b to copy the requested overlay from second level memory 104 to first level memory 102 via second data bus 110b and first data bus 110a. Further, the copied overlay replaces an overlay stored in first level memory 102. If the overlay stored in first level memory 102 to be replaced is "dirty," then the MMR performs a "write-back" protocol such that an overlay stored in second level memory 104 that corresponds to the "dirty" overlay is updated with new information that is written to the "dirty" overlay to be replaced in first level memory 102. In some embodiments, the "write-back" protocol is performed before the copied overlay replaces the overlay stored in first level memory 102.

Additionally, the MMR issues a content update signal 122 to update memory management unit 106 with information relating to the copied overlay, as discussed further below. Processor 100 then executes the function or accesses the segment of data included in the overlay replacing the "dirty" overlay.

Figure 2A:
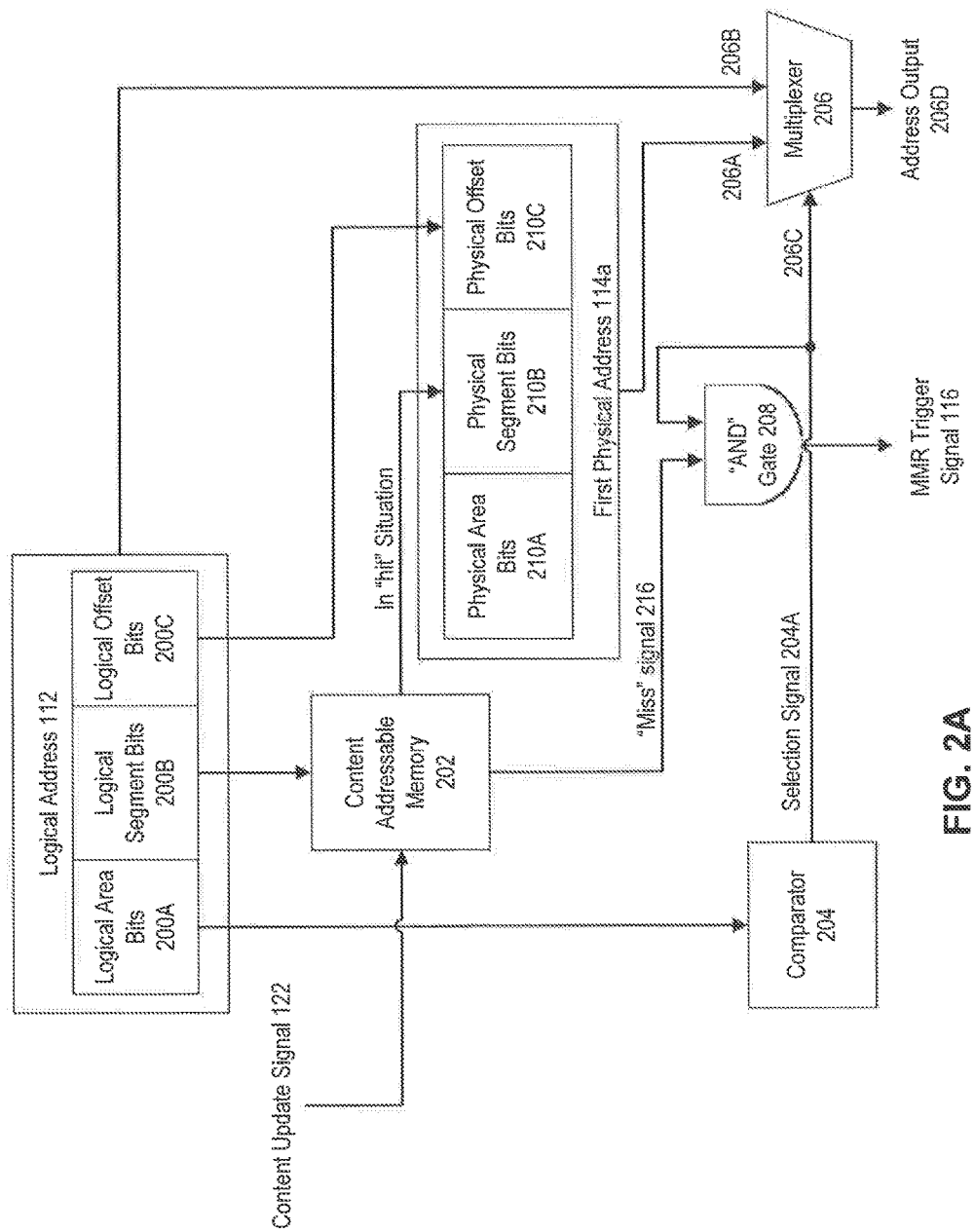
FIG. 2A is a diagram illustrating a memory management unit.

FIG. 2A shows an example of memory management unit 106, which receives logical address 112, as indicated in FIG. 1. Memory management unit 106 includes a content addressable memory 202, a comparator 204, a multiplexer 206, and an "AND" logic gate 208. Memory management unit 106 converts logical address 112, using content addressable memory 202, to first physical address 114a.

Logical address 112 is divided into three subsets of bits, including logical area bits 200A, logical segment bits 200B, and logical offset bits 200C. Similarly, first physical address 114a is also divided into three subsets of bits, including physical area bits 210A, physical segment bits 210B, and physical offset bits 210C.

Figure 2B:
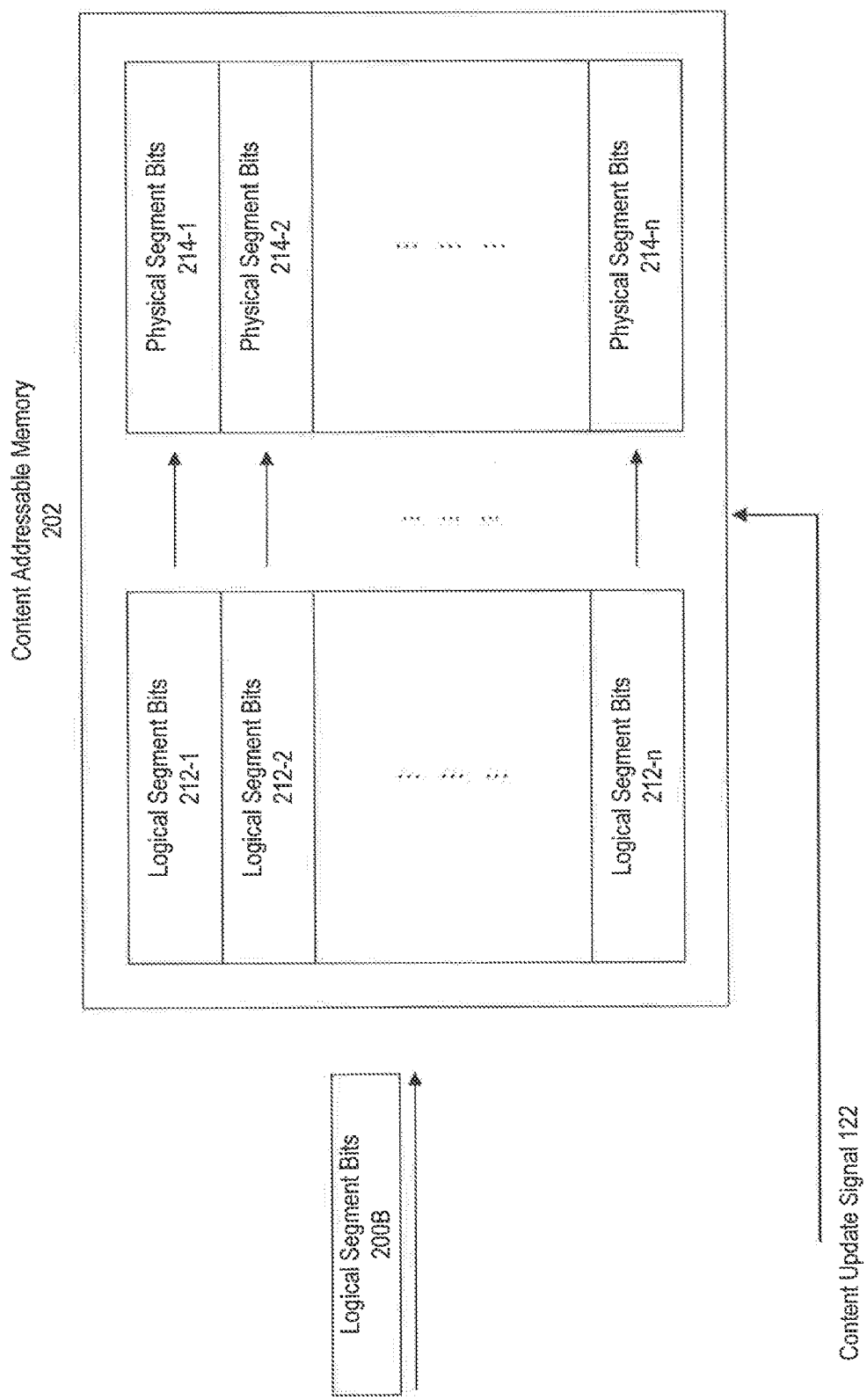
FIG. 2B is a diagram illustrating a content addressable memory.

FIG. 2B shows an example of content addressable memory 202. Referring to FIGS. 2A and 2B, logical segment bits 200B are provided to content addressable memory 202, which converts logical segment bits 200B to physical segment bits 210B if there is a "hit." A "hit" occurs if the logical address pointing to the requested overlay is in first level memory 102. Referring to FIG. 2B, content addressable memory 202 contains multiple entries of logical segment bits 212-1 to 212-n, of logical addresses, for overlays that exist in first level memory 102. Content addressable memory 202 also contains corresponding physical segment bits 214-1 to 214-n, of physical addresses, o the same overlays.

In content addressable memory 202, logical segment bits 200B are compared with logical segment bits 212-1 to 212-n contained in content addressable memory 202. If logical segment bits 200B match, for example, logical segment bits 212-1, then physical segment bits 214-1 are output as physical segment bits 210B by content addressable memory 202. This match corresponds to a "hit" situation. Similarly, if logical segment bits 200B match, for example, logical segment bits 212-2, then physical segment bits 214-2 are output as physical segment bits 210B by content addressable memory 202.

Referring to FIG. 2A, in the "hit" situation, after content addressable memory 202 outputs physical segment bits 210B, they are combined with physical area bits 210A and physical offset bits 210C. Physical offset bits 210C are identical to logical offset bits 200C, and they both indicate a starting bit of a requested function or a requested data segment in an overlay. Logical area bits 200A represent a predetermined logical memory area that is designated for overlays. Similarly, physical area bits 210A represent a physical memory area corresponding to the predetermined logical memory area that is designated for overlays.

First physical address 114a is provided to an input 206A of multiplexer 206, while logical address 112 is provided to another input 206B of multiplexer 206. An address output 206D of multiplexer 206 is determined based on a selection signal 204A provided at an input 206C of multiplexer 206. Selection signal 204A is provided by comparator 204, which determines whether logical area bits 200A of logical address 112 point to a predetermined logical memory area that is designated for overlays. If logical area bits 200A point to the predetermined logical memory area, selection signal 204A is configured to select input 206A, where first physical address 114a is provided for output on address output 206D. Processor 100 then accesses the overlay, based on first physical address 114a provided at address output 206D, and executes the function or accesses the segment of data included in the overlay.

If logical area bits 200A do not point to the predetermined logical memory area that is designated for overlays, selection signal 204A is configured to select input 206B, where logical address 112 is provided for output on address output 206D for executing programs or accessing data that are not divided into overlays.

Referring to FIGS. 2A and 2B, if logical segment bits 200B do not match any of logical segment bits 212-1 to 212-n (a "miss" situation), then content addressable memory 202 outputs a "miss" signal 216 to one of the inputs of "AND" gate 208. Comparator 204 outputs selection signal 204A to the other input of "AND" gate 208. If logical segment bits 200B do not match any of logical segment bits 212-1 to 212-n (a "miss" situation) and if logical area bits 200A point to the predetermined logical memory area that is designated for overlays, then "AND" gate 208 outputs MMR trigger signal 116 to initiate the MMR. That is, when there is a "miss," and when selection signal 204A is configured to select input 206A, then "AND" gate 208 outputs MMR trigger signal 116. Referring to FIG. 1, the MMR then copies the requested overlay from second level memory 104 to first level memory 102 via second data bus 110b and first data bus 110a. Processor 100 then executes the function or accesses the segment of data included in the overlay. Referring to FIGS. 2A and 2B, additionally, the MMR issues a content update signal 122 to replace a pair of logical segment bits (among entries 212-1 to 212-n) and corresponding physical segment bits (among entries 214-1 to 214-n) of an overlay to be replaced in content addressable memory 202 with the logical segment bits and corresponding physical segment bits of the requested overlay, which is copied to first level memory 102 from the second level memory 104. Programmers of the MMR may determine which overlay (and its pair of logical segment bits and physical segment bits) is replaced based on, for example, whether or not the overlay is recently or frequently requested.

In some embodiments, content addressable memory 202 further includes a flag, which includes one or more bits, associated with each of entries 212-1 to 212-n. Each flag indicates whether an overlay stored in first level memory 102 is "dirty." When a "dirty" overlay is replaced, then the MMR performs a "write-back" protocol such that the corresponding overlay stored in second level memory 104 is updated with new information that was written to the "dirty" overlay stored in first level memory 102.

Figure 3A:
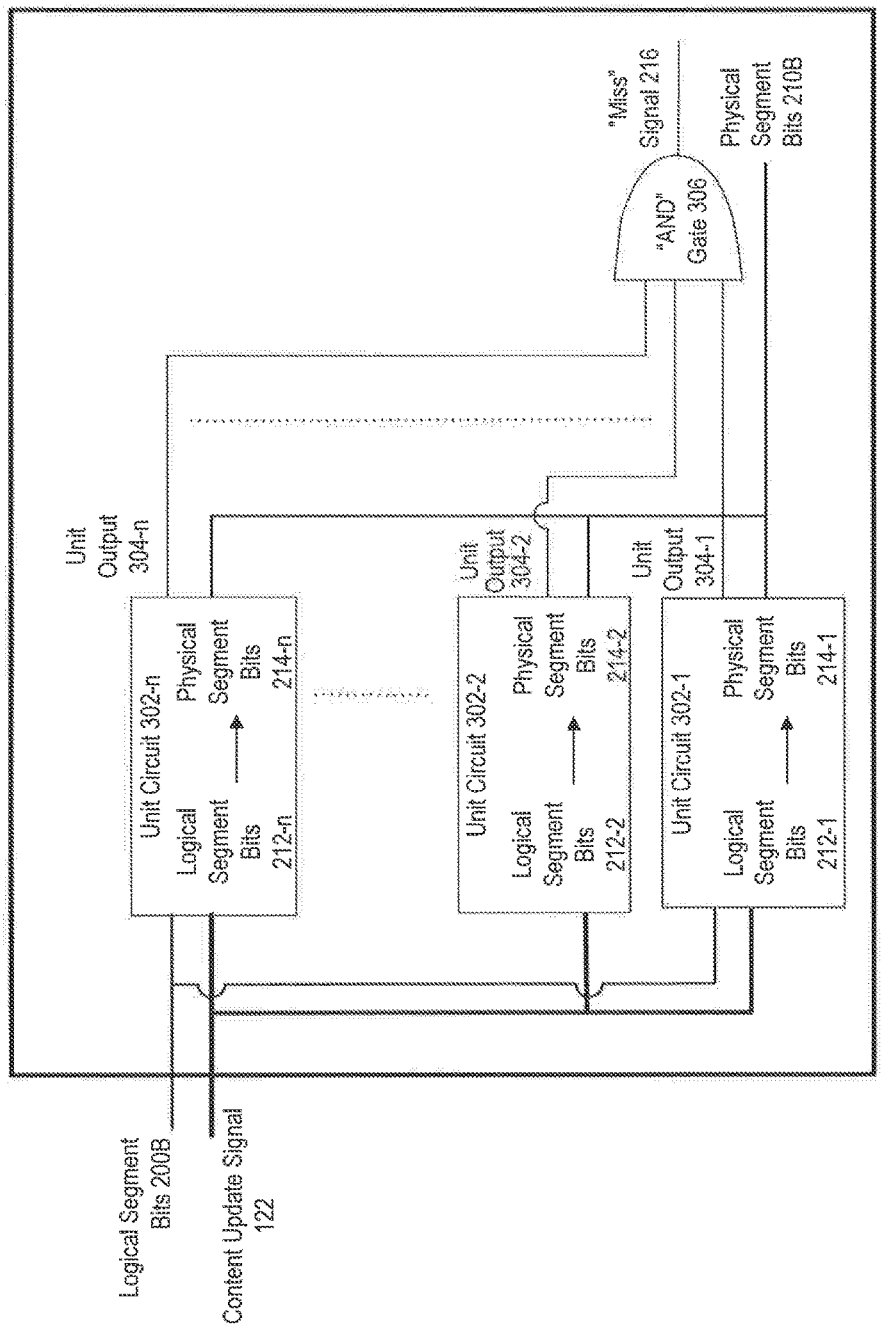
FIG. 3A is a diagram illustrating a translator circuit.
Figure 3B:
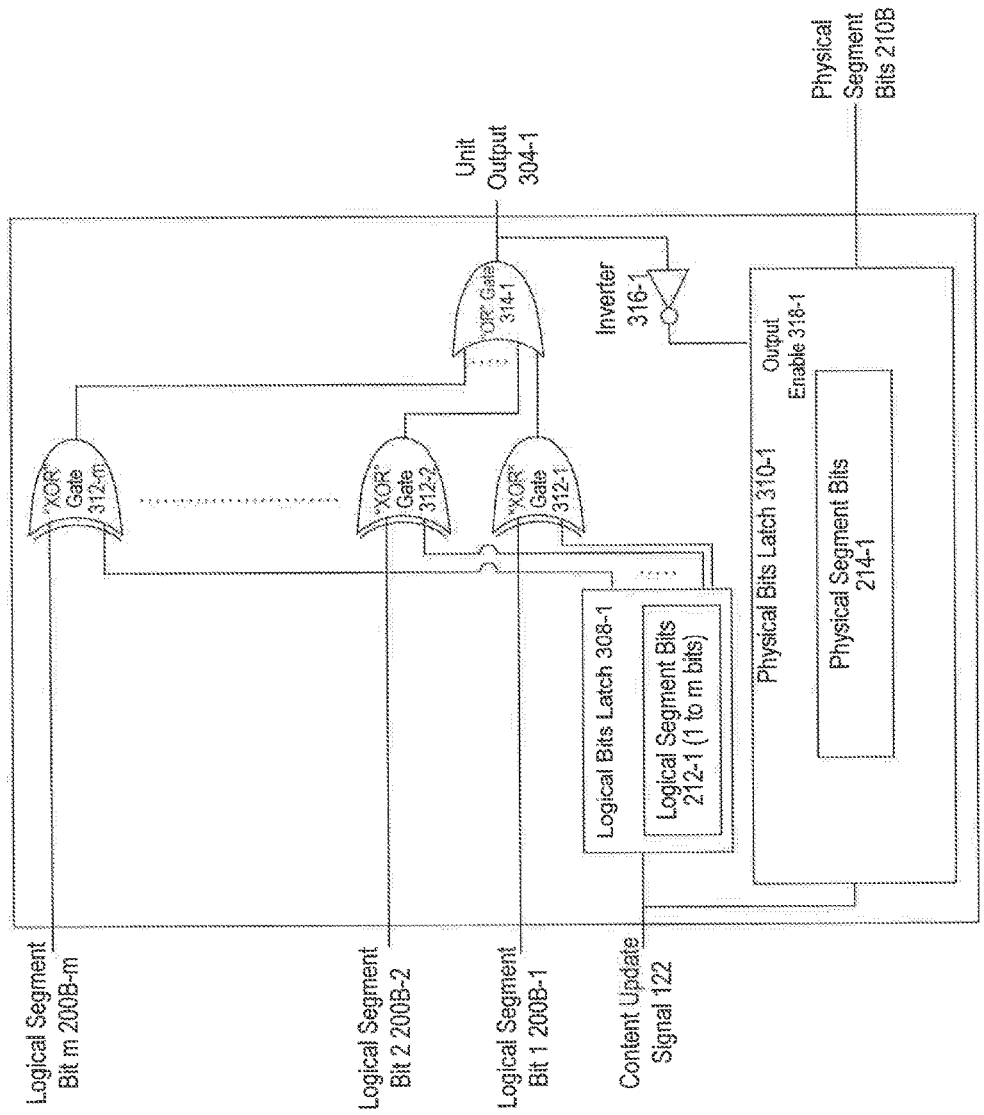
FIG. 3B is a diagram illustrating a unit circuit.

Referring to FIGS. 3A and 3B, in some embodiments, content addressable memory 202 of memory management unit 106 is replaced by a translator circuit 300. Translator circuit 300 includes unit circuits 302-1 to 302-n and an "AND" gate 306. Each one of unit circuits 302-1 to 302-n contains an entry of logical segment bits 212-1 to 212-n, of a logical address, for an overlay that exists in first level memory 102. Each one of unit circuits 302-1 to 302-n also contains an entry of corresponding physical segment bits 214-1 to 214-n, of a physical address, of the same overlay that exists in first level memory 102.

Further, in some embodiments, each of unit circuits 302-1 to 302-n receives logical segment bits 200B of logical address 112 provided by processor 100, and also receives content update signal 122 provided by the MMR. Content update signal 122 is provided by the MMR in a "miss" situation to replaces a pair of logical segment bits (one of 212-1 to 212-n) and corresponding physical segment bits (one of 214-1 to 214-n) with another pair of logical segment bits and corresponding physical segment bits of the requested overlay that is copied to first level memory 102 from second level memory 104. Additionally, unit circuits 302-1 to 302-n provide unit outputs 304-1 to 304-n, respectively.

Logical segment bits 200B are compared with each entry of logical segment bits 212-1 to 212-n. If logical segment bits 200B match, for example, logical segment bits 212-1, then physical segment bits 214-1 are output by unit circuit 302-1 as physical segment bits 210B. Additionally, unit output 304-1 becomes logic "0." This corresponds to a "hit" situation. If there is any "hit" among logical segment bits 212-1 to 212-n, then "AND" gate 306 outputs logic "0" and "miss" signal 216 is not activated.

On the other hand, if logical segment bits 200B do not match, for example, logical segment bits 212-1, then unit output 304-1 becomes logic "1." If logic segment bits 200B do not match any entry of logical segment bits 212-1 to 212-n, then all unit outputs 304-1 to 304-n become logic "1s." In this situation, "AND" gate 306 receives all logic "1s" at its inputs and outputs a logic "1," which activates "miss" signal 216 to "AND" gate 208, as indicated in FIG. 2A.

Referring to FIG. 3B, in some embodiments, unit circuit 302-1 includes a logical bits latch 308-1, a physical bits latch 310-1, "XOR" gates 312-1 to 312-m, an "OR" gate 314-1, and an inverter 316-1. Unit circuits 302-2 to 302-n include components identical or similar to the aforementioned components in unit circuit 302-1. Logical bits latch 308-1 contains logical segment bits 212-1, which include 1 to m bits. The 1 to m bits are provided as inputs to "XOR" gates 312-1 to 312-m, respectively.

Logical segment bits 200B also include 1 to m bits (logical segment bit 1 200B-1 to logical segment bit m 200B-m), which are also provided as inputs to "XOR" gates 312-1 to 312-m respectively. Each of logical segment bits 212-1 is compared with each of logical segment bits 200B using one of the corresponding "XOR" gates 312-1 to 312-*m*. When the first bit of logical segment bits 212-1 and the first bit of logical segment bits 200B are the same, "XOR" gate 312-1 outputs a logic "0." When these bits are different, "XOR" gate 312-1 outputs a logic "1." "XOR" gates 312-2 to 312-*m* function identically or similarly to "XOR" gate 312-1. Outputs of "XOR" gates 312-1 to 312-*m* are provided to inputs of a "OR" gate 314-1. If one of the outputs from "XOR" gates 312-1 to 312-*m* outputs a logic "1", which indicates the corresponding bits of logical segment bits 212-1 and logical segment bits 200B are different, "OR" gate 314-1 outputs a logic "1" at unit output 304-1.

When unit output 304-1 is logic "1," an output enable 318-1 of physical bits latch 310-1 receives a logic "0" because of inverter 316-1. Accordingly, physical bits latch 310-1 does not provide physical segment bits 214-1 when unit output 304-1 is logic "1," or when the first bit of logical segment bits 212-1 and the first bit of logical segment bits 200B are different. Referring to FIG. 3A, if unit outputs 304-1 to 304-*n* are all logic "1s," which indicates that logical segment bits 200B are different from logical segment bits 212-1 to 212-*n*, then "AND" gate 306 provides an activated "miss" signal 216 (e.g., a logic "1") to "AND" gate 208 of FIG. 2A. Further, physical bits latches 310-1 to 310-n do not provide physical segment bits 214-1 to 214-*n*.

Referring to FIG. 3B, when the first bit of logical segment bits 212-1 and the first bit of logical segment bits 200B are the same, "XOR" gate 312-1 outputs a logic "0."

Thus, output enable 318-1 receives a logic "1" because of inverter 318-1. Accordingly, physical bits latch 310-1 provides physical segment bits 214-1 when unit output 304-1 is logic "0," or when the first bit of logical segment bits 212-1 and the first bit of logical segment bits 200B are the same. Referring to FIG. 3A, if any of unit outputs 304-1 to 304-*n* is logic "0," then "AND" gate 306 also provides a logic "0" and "miss" signal 216 is not activated.

While the present invention has been described in connection with various embodiments, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An embedded system including a program to be executed, wherein the program is divided into overlays, the embedded system comprising:
   a processor configured to request one of the overlays, the requested overlay including a segment of the program to be executed by the processor;
   a first level memory device coupled to the processor, the first level memory device storing less than all of the overlays of the program; and
   a memory management unit coupled to the processor and the first level memory device, the memory management unit being configured to
      determine, based on a logical address provided by the processor, whether the requested overlay is stored in the first level memory device, and
      convert the logical address to a physical address when the requested overlay is stored in the first level memory device, wherein the physical address points to the requested overlay,
   wherein the logical address includes logical area bits, and the memory management unit is further configured to:
      determine whether the logical area bits point to a predetermined logical memory area that is designated for overlays,
      upon determining that the logical area bits point to the predetermined logical memory area, output the physical address, and
      upon determining that the logical area bits do not point to the predetermined logical memory area, output the logical address.

2. The embedded system according to claim 1, wherein the physical address is a first physical address, and wherein the processor is further configured to provide a direct memory access command when the requested overlay is not stored in the first level memory device, the embedded system further comprising:
   a second level memory device coupled to the processor and the first level memory device, the second level memory device storing all of the overlays of the program; and
   a secondary level memory controller coupled between the second level memory device and the processor, the secondary level memory controller being configured to
      receive the direct memory access command from the processor,
      provide, based on the direct memory access command, a second physical address and a memory operation command to the second level memory device, and
      copy the requested overlay from the second level memory device to the first level memory device.

3. The embedded system according to claim 2, wherein the memory operation command is a read command.

4. The embedded system according to claim 2, wherein the memory management unit is further configured to:
   provide a trigger signal to the processor before the processor provides the direct memory access command to the secondary level memory controller.

5. An embedded system including a program to be executed, wherein the program is divided into overlays, the embedded system comprising:
   a processor configured to request one of the overlays based on a logical address of the requested overlay, the requested overlay including a segment of the program to be executed by the processor, wherein the logical address includes logical area bits, logical segment bits, and logical offset bits;
   a first level memory device coupled to the processor, the first level memory device storing less than all of the overlays of the program;
   a translator coupled to the processor, the translator being configured to
      receive the logical segment bits from the processor, and
      convert, when the requested overlay is stored in the first level memory device, the logical segment bits into physical segment bits of a physical address, wherein the physical address points to the requested overlay stored in the first level memory device;
   a comparator, coupled to the processor, to receive the logical area bits of the logical address, the comparator being configured to provide a selection signal based on the logical area bits; and
   a multiplexer to receive the logical address, the physical address, and the selection signal, the multiplexer being configured to output one of the logical address and the physical address based on the selection signal.

6. The embedded system according to claim 5, the embedded system further comprising:

a second level memory device coupled to the processor and the first level memory device, the second level memory device storing all of the overlays of the program;

an AND gate configured to
 receive a MISS signal from the translator when the requested overlay is not stored in the first level memory device,
 receive the selection signal from the comparator, and
 provide a trigger signal, wherein the processor is responsive to the trigger signal to provide a direct memory access command; and a secondary level memory controller coupled between the second level memory device and the processor, the secondary level memory controller being configured to
 provide, based on the direct memory access command, a second physical address and a memory operation command to the second level memory device, and
 copy the requested overlay from the second level memory device to the first level memory device.

7. The embedded system according to claim 5, wherein the translator is a content addressable memory, the content addressable memory being configured to:
 store multiple entries of logical segment bits of logical addresses pointing to overlays stored in the first level memory device, the multiple entries of logical segment bits being multiple logical bits entries;
 store multiple entries of physical segment bits of physical addresses pointing to the same overlays stored in the first level memory device, the multiple entries of physical segment bits being multiple physical bits entries;
 compare the logical segment bits of the requested overlay with each of the multiple logical bits entries;
 output, when the logical segment bits of the requested overlay match one of the multiple logical bits entries, a corresponding entry of the multiple physical bits entries; and
 output, when the logical segment bits of the requested overlay do no match all of the multiple logical bits entries, a MISS signal.

8. The embedded system according to claim 5, wherein the translator includes:
 multiple unit circuits, each of the multiple unit circuits being configured to
  store an entry of logical segment bits of a logical address pointing to one of the overlays stored in the first level memory device, the entry of logical segment bits being a logical bits entry,
  store an entry of physical segment bits of a physical address pointing to the one of the overlays stored in the first level memory device, the entry of physical segment bits being a physical bits entry,
  determine whether the logical segment bits of the requested overlay match the logical bits entry,
  provide a unit output signal indicating whether the logical segment bits of the requested overlay match the logical bits entry, and
  output, when the unit output signal indicates a match, the physical bits entry; and
 a logic circuit configured to
  receive the unit output signal from each of the multiple unit circuits, and
  output, when the unit output signal from each of the multiple unit circuits does not indicate the match, a MISS signal.

9. The embedded system according to claim 8, wherein the logic circuit includes an AND gate.

10. The embedded system according to claim 8, wherein the logic circuit is a first logic circuit, and wherein at least one of the multiple unit circuits includes:
 a logical bits latch containing the logical bits entry;
 multiple second logic circuits, each of the multiple second logic circuits being configured to
  receive a bit of the logical bits entry as a first input,
  receive a bit of the logical segment bits of the requested overlay as a second input, and
  provide a first logic output signal indicating whether the first input and the second input match;
 a third logic circuit being configured to
  receive the first logic output signal from each of the multiple first logic circuits, and
  provide a second logic output signal to the first logic circuit, wherein the second logic output signal is the unit output signal; and
 a physical bits latch to receive an inverted second logic output signal, the physical bits latch being configured to output the physical bits entry based on the inverted second logic output signal.

11. The embedded system according to claim 10, wherein the multiple second logic circuits include multiple XOR gates, and the third logic circuit include an OR gate.

12. An embedded system including data to be accessed, wherein the data are divided into overlays, the embedded system comprising:
 a processor configured to request one of the overlays, the requested overlay including a segment of the data to be accessed by the processor;
 a first level memory device coupled to the processor, the first level memory device storing less than all of the overlays of the data; and
 a memory management unit coupled to the processor and the first level memory device, the memory management unit being configured to
  determine, based on a logical address provided by the processor, whether the requested overlay is stored in the first level memory device, and
  convert the logical address to a physical address when the requested overlay is stored in the first level memory device, wherein the physical address points to the requested overlay,
 wherein the logical address includes logical area bits, and the memory management unit is further configured to:
  determine whether the logical area bits point to a predetermined logical memory area that is designated for overlays,
  upon determining that the logical area bits point to the predetermined logical memory area, output the physical address, and
  upon determining that the logical area bits do not point to the predetermined logical memory area, output the logical address.

13. The embedded system according to claim 12, wherein the physical address is a first physical address, and wherein the processor is further configured to provide a direct memory access command when the requested overlay is not stored in the first level memory device, the embedded system further comprising:
 a second level memory device coupled to the processor and the first level memory device, the second level memory device storing all of the overlays of the data;
 a secondary level memory controller coupled between the second level memory device and the processor, the secondary level memory controller being configured to receive the direct memory access command from the processor, provide, based on the direct memory access command, a second physical address and a memory operation command to the second level memory device, and copy the requested overlay from the second level memory device to the first level memory device.

14. The embedded system according to claim 13, wherein the memory operation command is a read command.

15. The embedded system according to claim 13, wherein the memory management unit is further configured to:

provide a trigger signal to the processor before the processor provides the direct memory access command to the secondary level memory controller.

16. An embedded system including data to be accessed, wherein the data are divided into overlays, the embedded system comprising:

a processor configured to request one of the overlays based on a logical address of the requested overlay, the requested overlay including a segment of the data to be accessed by the processor, wherein the logical address includes logical area bits, logical segment bits, and logical offset bits;

a first level memory device coupled to the processor, the first level memory device storing less than all of the overlays of the data;

a second level memory device coupled to the processor and the first level memory device, the second level memory device storing all of the overlays of the data;

a translator coupled to the processor, the translator being configured to receive the logical segment bits from the processor, and convert, when the requested overlay is stored in the first level memory device, the logical segment bits into physical segment bits of a physical address, wherein the physical address points to the requested overlay stored in the first level memory device;

a comparator, coupled to the processor, to receive the logical area bits of the logical address, the comparator being configured to provide a selection signal based on the logical area bits; and a multiplexer to receive the logical address, the physical address, and the selection signal, the multiplexer being configured to output one of the logical address and the physical address based on the selection signal.

17. The embedded system according to claim 16, the embedded system further comprising:

an AND gate configured to receive a MISS signal from the translator module when the requested overlay is not stored in the first level memory device, receive the selection signal from the comparator, and provide a trigger signal, wherein the processor is responsive to the trigger signal to provide a direct memory access command; and a secondary level memory controller coupled between the second level memory device and the processor, the secondary level memory controller being configured to provide, based on the direct memory access command, a second physical address and a memory operation command to the second level memory device, and copy the requested overlay from the second level memory device to the first level memory device.

18. The embedded system according to claim 16, wherein, when the requested overlay is stored in the first level memory device, the requested overlay is written with new information, and the processor being further configured to:

write the new information to the requested overlay stored in the first level memory device; and write the new information to an overlay, corresponding to the requested overlay, stored in the second level memory device.

19. The embedded system according to claim 16, wherein, when the requested overlay is stored in the first level memory device, the requested overlay is written with new information, and the processor being further configured to:

write the new information to the requested overlay stored in the first level memory device; and write the new information to an overlay, corresponding to the requested overlay, stored in the second level memory device when the requested overlay being stored in the first level memory device is replaced.

* * * * *